United States Patent [19]

Morley et al.

[11] Patent Number: 4,944,004
[45] Date of Patent: Jul. 24, 1990

[54] INTERFACE CIRCUIT WITH TRANSIENT EVENT TOLERANCE

[75] Inventors: Robert S. Morley, Ottawa; Edward C. Carew, Carleton Place, both of Canada

[73] Assignee: Northern Telecom Limited, Montreal, Canada

[21] Appl. No.: 324,116

[22] Filed: Mar. 16, 1989

[51] Int. Cl.⁵ .................. H02H 9/06; H04M 19/00
[52] U.S. Cl. .................................... 379/412; 379/413; 361/119; 313/325
[58] Field of Search ............. 361/119, 117, 129, 130, 361/56, 28, 30; 313/325; 379/387, 412

[56] References Cited

U.S. PATENT DOCUMENTS

| | | | |
|---|---|---|---|
| 4,438,365 | 3/1984 | Atkinson | 313/325 |
| 4,586,105 | 4/1986 | Lippmann et al. | 361/117 |
| 4,729,055 | 3/1988 | Dorival et al. | 361/119 |

FOREIGN PATENT DOCUMENTS 2050408 4/1972 Fed. Rep. of Germany ...... 313/325

*Primary Examiner*—Jin F. Ng
*Assistant Examiner*—Randall S. Vaas
*Attorney, Agent, or Firm*—J. E. Moorhouse

[57] ABSTRACT

An interface circuit provides for coupling of communications signals between a conductor of a transmission path, and a key telephone system and provides for protection against electrical energies, as may be associated with transient electrical event occurrences along the transmission path. The interface circuit provides for coupling of some of these transient electrical energies from the transmission path conductor to an earth ground. The interface circuit includes a plurality of electrical components and a plurality of electrical conductors being fixed to either of first and second surfaces of a sheet of electrically insulating material. The electrical conductors are spaced apart from each other by at least a predetermined amount. Some of the electrical conductors connect the electrical components of the interface circuit in a workable arrangement whereby the communications signals may be coupled. First and second electrical conductors are connected to the earth ground and the transmission path conductor, and in combination are arranged to provide a coupling path for said some electrical energies. The coupling path comprises first and second terminating edge portions being arranged one within another, about an opening in the insulating sheet material. One of the first and second electrical conductors is connected to a respective one of the first and second edge portions via the opening. The terminating edge portions are spaced apart one from the other by a distance of less than the predetermined amount.

5 Claims, 2 Drawing Sheets

INTERFACE CIRCUIT WITH TRANSIENT EVENT TOLERANCE

INTRODUCTION

The invention is in the field of interface apparatus for coupling information signals between a transmission line and a telecommunications facility. More particularly, the invention relates to arrangements of interface apparatus which are intended to be tolerant of infrequent but electrically spectacular transient events, such as lightening strikes, momentary power line crosses and like occurrences, in relation to the transmission line.

BACKGROUND OF THE INVENTION

The industry of telephony was the first to provide protection against transient events such as voltage spikes and current surges as appear from time to time on transmission lines. Such transient events may be summarily described as unwanted and individually unpredictable burst occurrences of electrical or electromagnetic energy. The effect of any such transient event occurrence upon a station set, a transmission line, or a central facility may range from a bit of noise in a communications signal, to destruction of physical apparatus. In a central office telephone exchange environment, transmission facilities, such as telephone lines and trunks are each physically connected to the telephone exchange apparatus via an interface circuit. The primary requirement of the interface circuit is that of passing the desired communications signals between the transmission line and associated apparatus while shielding the apparatus from any potentially destructive voltages or currents. This primary requirement is somewhat complicated in many applications where the interface circuit must also provide either a supply or a termination of energizing current for operation and supervision of the transmission line.

The problems of meeting these requirements with efficient and commercially competitive means has continued to be a focus of research and design development, from the very beginning of the telephone industry. However, the advent of electrically fragile semiconductor based telecommunications transmission terminals and telephone exchange switching facilities in the past decade or so, has served to amplify the severity of these requirements. For example, a comparatively robust step by step central office, crossbar central office, or electromechanical key system, in days of yore, was typically interfaced with a telephone line by means of a rather bulky transformer. The bulk of the transformer was dictated by the requirement that the transformer's magnetic core be large enough to carry the magnetic flux associated with direct line current, without the core becoming saturated. Consequently there was abundant space for transformer windings and winding insolation sufficient to withstand spikes in excess of ten thousand volts. Although the windings would inductively couple intolerable amounts of transient energy by today's standards, the electromechanical telephone exchanges of the time were inherently robust and such was of little practical concern. This is in stark contrast to the interface requirements of a typical modern pulse code modulated time division multiplex (PCM TDM) telephone switching system. These interface requirements were satisfied by a new approach to the interface problem, as exemplified by V. V. Korsky in U.S. Pat. No. 4,103,112 issued on July 25, 1978, and titled "Telephone Line Circuit With Differential Loop Current Sensing And Compensation". Korsky's circuit employed precision direct loop current flux cancellation means to drastically reduce the core size required in the transformer. A miniature core limits the amount of transient energy that can be inductively coupled across the transformer windings. Any energy so coupled is of a relatively moderate magnitude, the bulk of which can be directed to ground by convenient and inexpensive means. For example, one such means is that of silicon diodes, of a two or three ampere peak current rating, arranged in a clamping circuit, and being connected between the transformer and onfollowing circuitry.

The size reduction of the transformer core and windings also necessitated a reduction of winding insulation thickness as compared to the bulky transformer. Consequently the smaller windings are able to withstand voltage spikes of only a few thousand volts before breakdown occurs. Hence, it is preferred and considered essential by some operating telephone companies, that any telephone facility or apparatus coupled to a telephone line or a trunk must be protected by some arrangement of devices intended for absorbing any extreme portion of the energy of a transient burst, before the extreme energy reaches any transformer windings.

In a central office environment, the devices of choice are usually gas tubes. Gas tubes, as stated in the "SURGE PROTECTION TEST HANDBOOK" published in 1982 by the KeyTek Instrument Corp. of Burlington, Mass., 01803, U.S.A., are inherently robust and reliable devices which represent a refinement of uncontrolled flashover that occurs between terminals in air. Gas tubes are available with closely predetermined breakdown characteristics from around one hundred to several thousand volts. The breakdown characteristics are determined by electrodes of predetermined design shape and spacing which reside in an envelope of one or more gases at a suitable pressure.

A less reliable, but least costly and most widely used protection device in the telephone industry, is the well known carbon block. Carbon blocks have proven to be an effective means of protecting personnel and property from energy surges on transmission lines. Although the carbon block has initially reliable operating characteristics, after repeated breakdowns it is predictably unpredictable, as far as the protection of fragile electronic equipment is concerned. In spite of this, it is still the device of choice for the protection of low cost apparatus such as subscriber telephone sets and the like.

Until recently the typical key telephone system has traditionally been little more than a collection of telephone sets arranged to share several telephone lines connected to a central office. In such arrangements, carbon block protection has satisfactorily fulfilled the requirements of most operating telephone companies. However now, subscriber owned computer controlled solid state key like telephone systems have become very popular. These newer key systems tend to be more vulnerable to suffering catastrophic damage as a result of a transient event occurrence, in spite of the standard use of carbon block protectors at the subscriber's premises.

Transient event occurrence vulnerability has been identified in the trunk interface circuit which transformer couples signals between tip and ring (CO) trunk leads and the solid state key like telephone system. In these newer key systems, the size of the interface transformer has been further reduced, to reduce the manufacturing cost. Lesser transformer core size dictated lesser winding insulation, such that typical breakdown occurs in the neighborhood of a thousand volts. Theoretically, this should be sufficient, on the assumption that the carbon block protection actually meets the accepted standard. In practice however, this is not sufficient in every instance to provide for adequate protection in every installation.

A contributing factor to inadequate protection of electronic equipment appears to be a wide variance of actual installation conditions and configurations of carbon block protection apparatus, in combination with various line and trunk entrances at different subscriber premises. An installation is usually put in place by a telephone craftsperson. The telephone craftsperson is faced with a wide variety of physical installation situations some of which are without an easily accessible grounding location. Furthermore, the telephone craftsperson may be unaware of the potentially deleterious effects of inductive reactance, as may accompany a long run of light gauge grounding wire in association with a carbon block protector installation. In some instances a long ground wire run, short of installing a ground rod, cannot be avoided. As may be appreciated, other than the transformer winding insulation in the interface circuit in such installations, there is little or nothing to impede a five or ten microsecond leading edge of transient impulse energy from damaging an electrically fragile telephone apparatus. Even if a potentially ineffective protection situation is identified, most operating telephone companies are reluctant to incur the cost of on site engineering of sophisticated nonstandard protection arrangements. Hence in the case of a new installation of a subscriber owned apparatus, the subscriber must incur such cost or risk almost certain significant damage to the new telephone system at sometime in the future.

It is an object of the invention to provide an arrangement whereby the vulnerability of telecommunications apparatus to transient electrical events in association with a transmission line is reduced.

It is a further object of the invention to provide a line interface circuit for coupling communications signals between a telephone line and a telephone apparatus whereby the vulnerability of the apparatus to transient electrical events in association with a transmission line s effectively reduced.

The invention provides an overvoltage device, for use in combination with an electrical circuit wherein the electrical circuit includes a sheet of electrically insulating material having first and second surfaces with at least one of the surfaces carrying conductors of the electrical circuit. The conductors are spaced apart one from the other by at least a predetermined amount. The electrical circuit is operable in response to energizing current from a power supply connected with an earth ground, for terminating a transmission path. The overvoltage device includes a wall traversing the sheet of insulating material between the first and second surfaces and defines an opening therebetween. A first conductor is carried by the first surface and includes a first terminating edge which surrounds the opening and is spaced apart therefrom. A second conductor is carried by the second surface, and the wall and protrudes therebeyond to a second terminating edge. The second terminating edge is spaced from the first terminating edge by less than the predetermined amount.

One example of the invention is the telephone system installation at a telephone subscriber premises, for providing communications by way of at least one transmission line having tip and ring leads extending to a service entrance at the telephone subscriber premises. The installation comprises a telephone system apparatus being installed within the telephone subscriber premises and including an interface circuit having a direct current isolation device of limited withstand characteristics, for coupling alternating current information signals with the tip and ring conductors of the transmission line. Overvoltage breakdown devices are connected between any convenient electrically conductive element associated with earth ground and the tip and ring conductors. A power supply means is connected to power leads and earth ground associated with a local electrical supply utility, for supplying energizing current for operation of the telephone system apparatus. A sheet of electrically insulating material including first and second surfaces and a pair of openings each being defined by a peripheral wall traversing the insulating material between the first and second surfaces carries the direct current isolation device, fixed against one of the surfaces. Tip and ring terminating edges portions are carried by the peripheral walls of the respective openings and by the first surface. A ground electrical conductor is carried by the first surface and includes ground terminating edges. One and another of the ground terminating edges surrounds the tip terminating edge portion and the ring terminating edge portion respectively and is spaced apart therefrom by a distance characterized by a breakdown voltage of less than said withstand voltage. Tip and ring electrical conductors each are carried by the second surface and are connected to the tip and ring terminating edge portions via respective ones of the pair of openings.

In an example, in accordance with the invention, a telephone system installation at a telephone subscriber premises is capable of providing communications by way of a transmission line having tip and ring leads extending to a service entrance at the telephone subscriber premises. The installation comprises a telephone system apparatus being installed within the telephone subscriber premises and including an interface circuit having a direct current isolation device of limited withstand characteristics for coupling alternating current information signals with the tip and ring conductors of the transmission line. Overvoltage breakdown devices are connected between any convenient electrically conductive element associated with earth ground and the tip and ring conductors. A power supply is connected to power leads and earth ground associated with a local electrical supply utility, for supplying energizing current for operation of the telephone system apparatus. The direct current insolation device and ground, and tip and ring electrical conductors, are fixed to the surface of a sheet of electrically insulating material for supporting same. The ground and tip and ring electrical conductors are each bounded by a peripheral edge, with each peripheral edge being separate from any other peripheral edge by a first predetermined amount. The ground conductor is connected to the earth ground, and the tip and ring conductors are connected between the direct current insolation device and the respective tip and ring leads of the transmission path. The ground electrical conductor includes first terminating edge portions and the tip and ring electrical conductors each include a second terminating edge portion. Each of the second terminating edge portions is arranged in juxtaposition with the surface of the sheet and is spaced apart from one of the first terminating edge portions by a second predetermined amount being less than said first predetermined amount.

BRIEF DESCRIPTION OF THE DRAWINGS

An example embodiment is described with reference to the accompanying drawings in which;

FIG. 1 is a pictorial illustration of a subscriber telephone system in a typical arrangement with a transmission line and a protector apparatus, the transmission line being that which is subject to a transient event occurrence once in a while;

DESCRIPTION OF THE EXAMPLE EMBODIMENT

Figure 1:
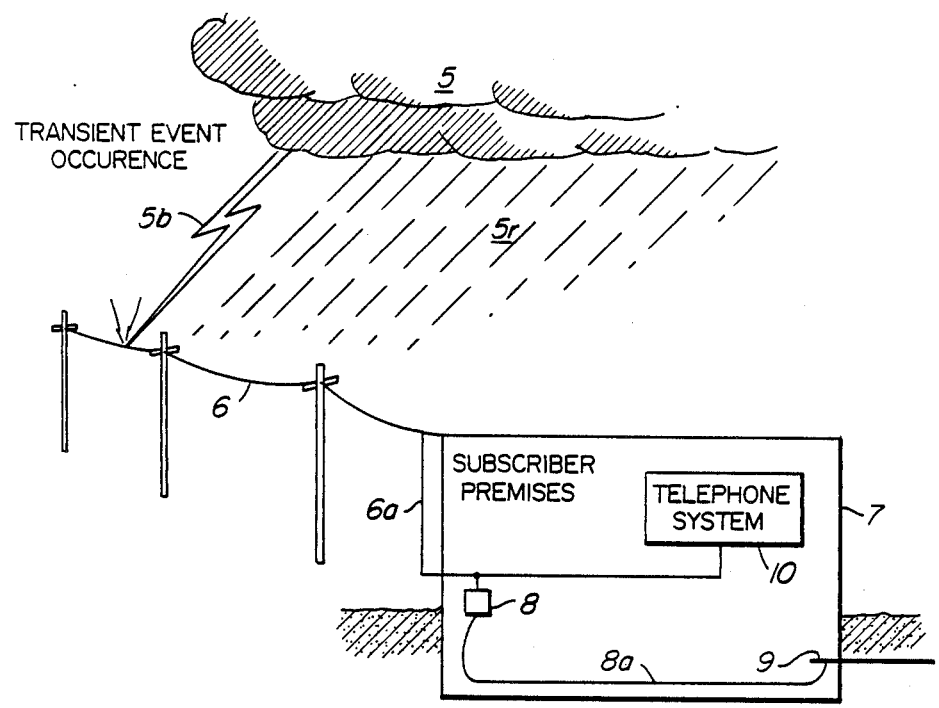

In FIG. 1, a typical subscriber premises is shown to have a telephone system 10, very likely a so called key telephone system. A pole supported transmission line 6 is connected to the telephone system 10 by way of a service entrance 6a. A protector apparatus 8 is connected between the transmission line 6, adjacent the service entrance 6a, and a utility water supply pipe 9, via a conductor 8a. The conductor 8a is very likely provided by a piece of so called lamp cord. The length of the conductor 8a is preferably much less than the distance between the service entrance 6a and the telephone system 10, however this is not always a practical arrangement for a telephone installer to install. As is illustrated in FIG. 1, the transmission line 6 is sometimes subjected to a transient electrical event, in this case a thunderstorm, which is illustrated as being in the usual thunderstorm process of raining (at 5r) and lightening and thundering (at 5b). In such an event, an extra ordinary energy pulse is transmitted away from the location of the lightening strike along the transmission line 6. Some of the energy pulse arriving at the service entrance 6a is very likely to be sufficient to destroy the telephone system 10 were it not for the protector apparatus 8. However, if the protector apparatus 8 is not properly functional or if the conductor 8a is too long, the shortest electrical distance to earth ground may be through the telephone system 10. Also in the event that the conductor 8a is merely excessively inductive, the telephone system 10 may be voltage stressed beyond its tolerance for a few microseconds, but even this short an overvoltage interval may wreak serious damage to the modern day electronic key telephone system.

Figure 2:
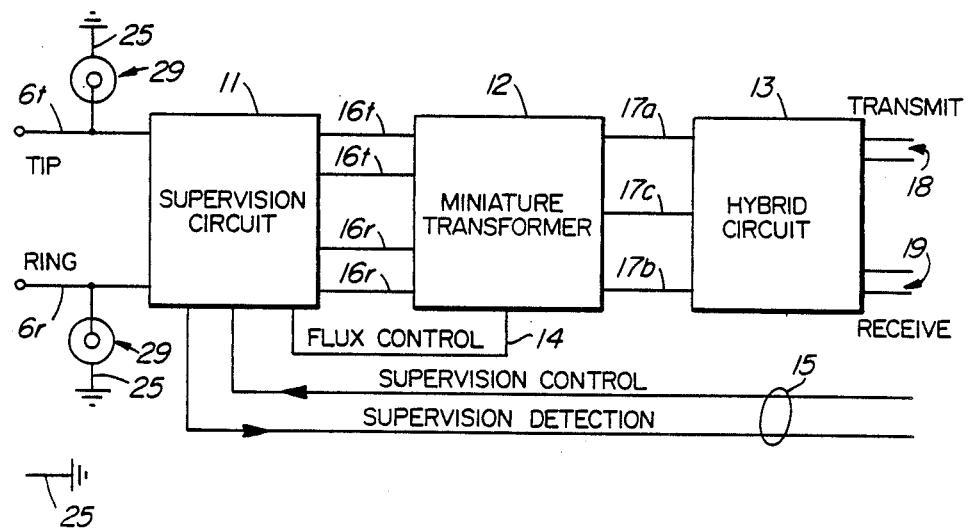
FIG. 2 is a block schematic diagram of a line interface circuit used in the subscriber telephone system in FIG. 1, in accordance with the invention.

The interface circuit in FIG. 2 includes a supervision circuit 11 which is connected between tip and ring terminals 6t and 6r and a direct current isolation device, in this example a miniature transformer 12. The supervision circuit 11 includes supervision detection circuitry, not shown, for detecting a seizure of the transmission line 6 by a remote telephone facility, not shown, as occurs during a normal part of a call progress. The supervision circuit 11 also includes supervision control circuitry, not shown, which is instrumental for initiating a call progress from the telephone system 10. The supervision circuit 11 further includes flux control circuitry, not shown, which is functional via a flux control lead 14 for maintaining the core in the miniature transformer 12 substantially void of direct current associated magnetic flux. The supervision circuitry is connected into the telephone system 10 via supervision control and detection leads shown at 15. Tip and ring windings, not shown, in the supervision circuit 11 are coupled with the tip and ring leads 6t and 6r and with the supervision circuitry, via leads 16t and 16r.

A hybrid circuit 13 is connected to a centretapped secondary winding, not shown, in the miniature transformer 12 via leads 17a, 17b and 17c, and to transmit and receive leads 18 and 19 of the telephone system 10, to provide a 2 wire/4 wire conversion coupling with the transmission line 6. Overvoltage protection devices at 29 in accordance with the invention, are each connected between one of the tip and ring leads 6t and 6r and an earth ground 25, which is provided via a power supply 20 illustrated in FIG. 3.

Figure 3:
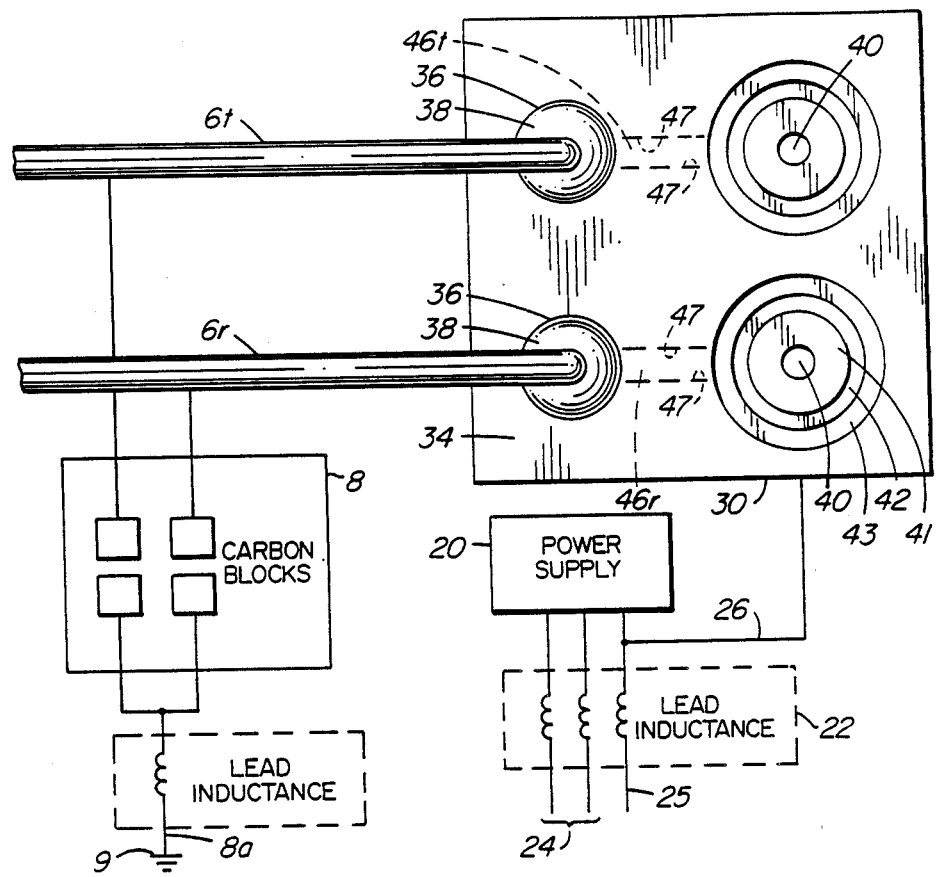
FIG. 3 is a plan view of a protection device in the line interface circuit in FIG. 3, the plan view being depicted in combination with the protector apparatus in FIG. 1 and a power supply of the telephone system in FIG. 1.

In FIG. 3 the tip and ring leads 6t and 6r are illustrated as being terminated on a sheet of insulating material 30 at land formations 36 which are covered with solder 38. The insulating material 30 is usually provided by a fiber reinforced plastic structure which carries copper leads, as is commonly known in the circuit board manufacturing art. In this case, for purposes of simple illustration, the 30 insulating material shown is but a small portion of the circuit board structure which carries one or more of the line interface circuits, as previously discussed in relation to FIG. 2. A surface 34d of the circuit board 30 consists of an insulating material which is either the sheet material itself or an overlay of solder mask material which is applied during the manufacturing process. The solder mask material is itself a dielectric. The tip and ring leads 6t and 6r are also connected as shown to the protector apparatus 8, in this example carbon blocks. The carbon blocks are connected via the conductor 8a to the water pipe earth ground indicated at 9. In this example, the conductor 8a is shown to have some measurable inductance associated therewith. A power supply 20 is connected to a source of utility power, typically 115 volts at 60 Hz, via leads 24, for the purpose of supplying the telephone system 10 including line circuits as shown in FIG. 2, with energizing current. An earth ground associated with the utility power source is connected via a lead 25 to the power supply 20 and thence to the telephone system 10 via an earthing conductor 26. Each of the leads 24 and 25 will normally have some measurable inductance as is indicated at 22. However, in many installations this lead inductance is significantly less than the inductance associated with the conductor 8a. In such installations, the power supply earth ground, provided via the leads 26 and 25, is an electrically preferred discharge path for any extreme electrical potential traversing the transmission line 6. In order to protect the telephone system 10, each of the line interface circuits is provided with overvoltage coupling paths 40, in association with the conductors of any transmission line connected to the telephone system 10.

Figure 4:
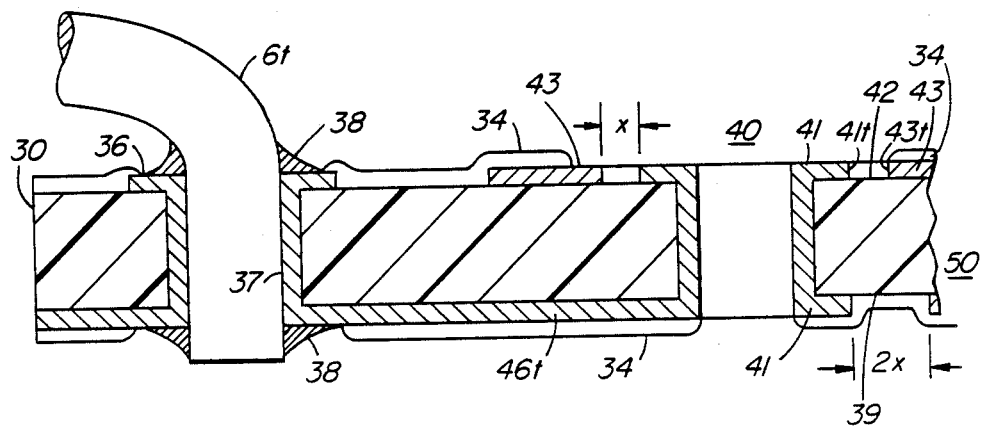
FIG. 4 is a sectional view of the protection device, taken along a line AA in FIG. 3.

The structure and operation of the overvoltage coupling paths is further discussed with reference to FIGS. 3 and 4 taken together. The circuit board 30 includes upper and lower surfaces having copper conductors formed thereon with various portions of the conductors being defined by peripheral edges 47 are numerically labelled, for example, 36, 37, 41 and 43. A wall of an opening in the printed circuit board 30 is plated with copper to provide a 'plated through hole' structure 37, into which the tip conductor 6t is soldered. The plated through hole structure 37 includes a land area 36 which is partially covered by a layer of solder 38. In manufacture the solder 38 is applied, for example by a wave soldering process, against the lower portion of the circuit board 30 and while in a fluid state the solder wicks up along the lead in the plated through hole, to firmly solder the lead 6t in place. The solder is prohibited from contacting all of the copper surfaces on the circuit board 30 by a solder masking dielectric material 34 having been previously applied to various areas of the circuit board in a predetermined pattern. The overvoltage coupling path 29 is provided at 40 and includes a plated through hole which may or may not be occupied by an electrical conductor. In this case, for convenience of illustration, the overvoltage coupling path is shown in its unoccupied form, with connection thereto being provided by a conductor 46t. The overvoltage coupling path includes annular land areas at 41 on both the upper and lower sides of the circuit board 30. On the upperside, the annular land area is surrounded by an earth grounded conductor 43 which is spaced apart from the land area 41 by a distance of between about 0.5 and 0.6 millimeters across the surface of the circuit board material at 42. In FIG. 3 this distance is indicated as "x" and is that distance as measurable between terminating edges 41t and 43t. In contrast, on the lower surface of the circuit board, a greater separation of land area and another conductor 50 is demonstrated at 39. In this example, the lower land area 41 is spaced apart from the conductor 50 by about twice said predetermined distance, such distance being a minimal distance for separation of the conductor as exemplified by 46t and 46r.

As the conductor 43 is earth grounded through the power supply 20, any tendency for an itinerant energy pulse of a potential that might damage winding insulation in the transformer 12 is substantially reduced by ionized air path conduction between the land 41 and the earth grounded conductor 43. Of course the distance by which the land area 41 and the conductor 43 are separated may be varied somewhat to be optimised for the purposes intended. However, the exemplified structure has been found to function with consistent and repeatable characteristics for as many as 200 repeated current conduction periods of a few microseconds. Typically, after a few microseconds time the carbon block structure usually becomes sufficiently conductive to provide an adequate earthing path.

We claim:

1. An interface circuit, for coupling communications signals between a conductor of a transmission path and a terminating facility, and for coupling some electrical energies, as may be associated with transient electrical event occurrences along the transmission path, from said transmission path conductor to an earth ground, comprising:
    a plurality of electrical components;
    a plurality of electrical conductors each being bounded by a peripheral edge, the peripheral edges being spaced apart from each other by at least a predetermined amount, some of said conductors connecting the electrical components of the interface circuit in a workable arrangement, whereby said communications signals may be coupled;
    a sheet of electrically insulating material having first and second surfaces and an opening being defined by a wall traversing the insulating material between the first and second surfaces, the electrical components and the plurality of electrical conductors being fixed to at least one of the surfaces;
    a first electrical conductor being for connection with the earth ground, said first conductor being carried by the first surface, surrounding the opening and being spaced apart therefrom; and
    a second electrical conductor being for connection to the conductor of the transmission path, said second conductor being carried by said wall and protruding from the opening and being separated from said first electrical conductor by a distance of less than the predetermined amount.

2. An electrical circuit being operable in response to energizing current from a power supply connected with an earth ground, for terminating a transmission path, the electrical circuit comprising:
    a sheet of electrically insulating material having first and second surfaces at least one of the surfaces carrying conductors of the electrical circuit, the conductors being spaced apart one from the other by at least a predetermined amount;
    a wall traversing the insulating material between the first and second surfaces of the sheet and defining an opening therebetween;
    a first conductor being carried by the first surface, and having a first terminating edge surrounding the opening and being spaced apart therefrom; and
    a second conductor being carried by the second surface, and said wall, and protruding therebeyond to a second terminating edged being space from the first terminating edge by less than the predetermined amount.

3. An electrical circuit as defined in claim 2 wherein said wall is annular, said first terminating edge defines a first annulus surrounding the opening and being spaced apart therefrom, and said second terminating edge defines a second annulus within the first annulus and being uniformly separated from the first terminating edge.

4. A telephone system installation at a telephone subscriber premises for providing communications by way of at least one transmission line having tip and ring leads extending to a service entrance at the telephone subscriber premises, the installation comprising:
    a telephone system apparatus being installed within the telephone subscriber premises and including,
    an interface circuit having a direct current isolation device including insulation capable of withstanding an electrical potential of greater than a predetermined limit, and for coupling alternating current information signals with the tip and ring conductors of the transmission line;
    overvoltage breakdown devices being electrically connected between an earth ground and the tip and ring conductors;
    power supply means being connected to power leads and an earth ground associated with a local electrical supply utility, for supplying energizing current for operation of the telephone system apparatus;
    a sheet of electrically insulating material including first and second surfaces and a pair of openings each being defined by a peripheral wall traversing the insulating material between the first and second surfaces, the direct current isolation device being fixed against one of the surfaces;

tip and ring terminating edge portions being carried by the peripheral walls of the respective openings, and the first surface;

a ground electrical conductor being carried by the first surface and including ground terminating edges, one and another ground terminating edges surrounding the tip terminating edge portion and the ring terminating edge portion respectively and being spaced apart therefrom by a distance defining an air path of an ionizing potential of less than said predetermined limit;

a tip electrical conductor being carried by the second surface, and being connected to the tip terminating edge portion via one of the pair of openings; and a ring electrical conductor being carried by the second surface and being connected to the ring terminating edge portion via another one of the pair of openings.

5. A telephone system installation as defined in claim 4 wherein each said wall is annular and each tip and ring terminating edge portion defines an annulus being uniformly separated from the nearby ground terminating edge.

* * * * *